United States Patent [19]
Colovas et al.

[11] 3,712,239
[45] Jan. 23, 1973

[54] STEERING MECHANISM

[75] Inventors: Denny D. Colovas; John S. Logan; Richard R. Skruch, all of Dearborn, Mich.

[73] Assignee: Ford Motor Company, Dearborn, Mich.

[22] Filed: Oct. 4, 1971

[21] Appl. No.: 186,212

[52] U.S. Cl. ..............................................104/130
[51] Int. Cl. ...............................................E01c 9/02
[58] Field of Search.......................104/96, 105, 130

[56] References Cited

UNITED STATES PATENTS

| | | | |
|---|---|---|---|
| 3,621,790 | 11/1971 | Broome | 104/130 |
| 3,593,665 | 7/1971 | Marty | 104/130 |
| 3,643,600 | 2/1972 | Bertin | 104/130 |
| 3,098,454 | 7/1963 | Maestrelli | 104/130 |

*Primary Examiner*—Gerald M. Forlenza
*Assistant Examiner*—D. W. Keen
*Attorney*—Keith L. Zerschling et al.

[57] ABSTRACT

A steering mechanism for a vehicle of a guided transportation system is disclosed. An axle for the vehicle has a central portion pivotably connected to supporting structure of the vehicle. The axle has vehicle wheels secured to opposite ends thereof and steering structures located adjacent associated vehicle wheels. The steering structures include front and back guide wheels for engaging a guide rail to direct the vehicle along the transportation system. The front and the back guide wheels are interconnected with a spring secured to the axle which acts to bias them into engagement with the guide rail. Structure is provided which permits the devices interconnecting the guide wheels and the spring to move relative to the associated vehicle wheel whereby the spring is loaded or unloaded depending upon the direction of movement. Any loading and unloading of the spring causes the axle to be pivoted about its connection with the vehicle support structure whereby the vehicle is steered. The steering mechanism also includes a deployable switching device for holding the guide wheel in contact with the associated guide rail when the switching device is deployed.

6 Claims, 5 Drawing Figures

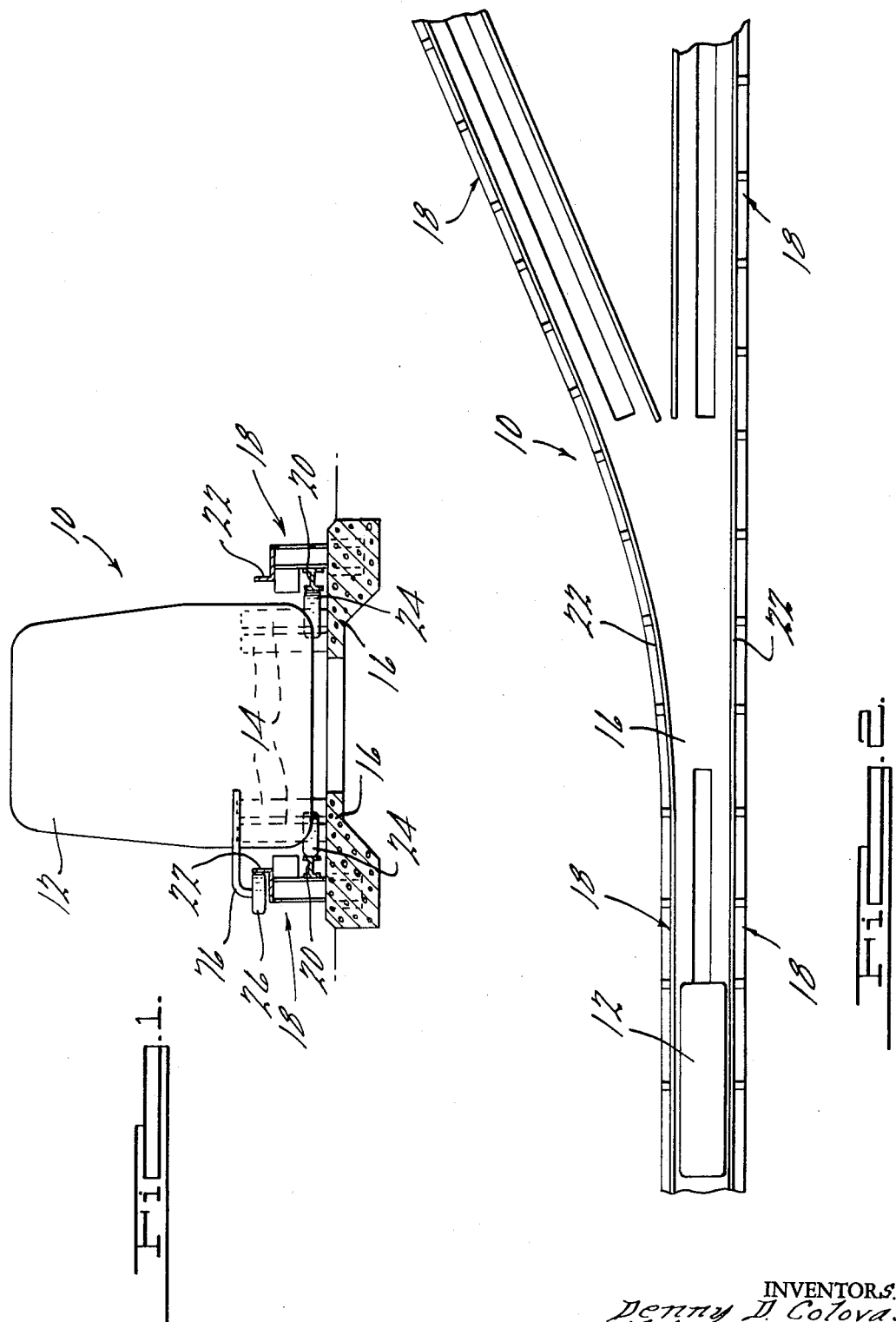

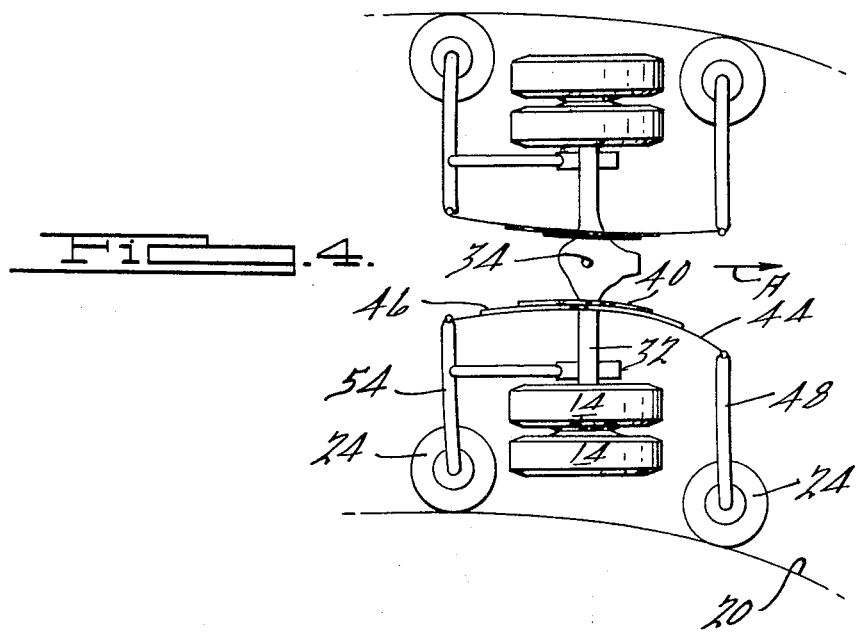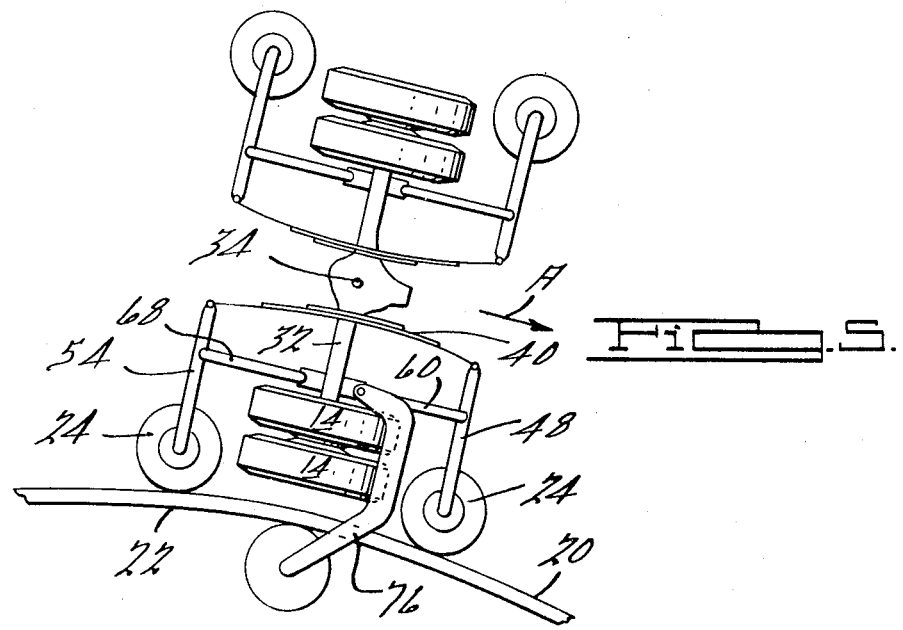

STEERING MECHANISM

BACKGROUND OF THE INVENTION

The prior art has taught many different transportation vehicles which may be guided or steered along predetermined paths. Examples of such vehicles are railroad and subway vehicles which are guided or steered along rails to move the vehicle along a predetermined path. The railroad or subway vehicle is steered from one path of travel to another path of travel by intricate switching mechanisms. These switching mechanisms require the shifting of track elements in order to steer the vehicle onto a different path of travel.

Steering mechanisms are also known for pneumatic tired vehicles used in a guided transportation system. These steering mechanisms generally function in a manner similar to the switching system for a track type vehicle. For example, U.S. Pat. No. 3,098,454, issued July 23, 1963, teaches a switching and steering mechanism for a pneumatic tired vehicle wherein movable guide elements associated with the roadbed are employed to steer the vehicle from one path of travel to another path of travel. Once again, the disadvantage of this type of transportation system is that the guide elements used in switching and steering the vehicle must be switched in order to switch the vehicle from one path of travel to another path of travel. The apparatus for switching such guide elements in order to steer the vehicle through a switch is generally expensive and complex. Also, such switching systems require a spacing or headway between vehicles in order to accomplish a switching operation.

It is the general purpose of this invention to provide a steering mechanism for a guided vehicle which eliminates some of the difficulties found in the complex steering mechanisms for such guided transportation systems. More particularly, the steering mechanism for a guided vehicle in accordance with the teachings of this invention is a so called "onboard" steering mechanism in which the active steering elements are carried on portions of the vehicle rather than by the track or roadbed over which the vehicle passes. The track or roadbed, in accordance with the steering mechanism of this invention, carries only inactive elements which cooperate with the vehicle's active elements in order to steer the vehicle along a path or from one path to another path. This type of switching system reduces the spacing or headway between vehicles required for a switching operation to a minimum. It is a principal purpose of this invention to provide a steering mechanism of simple construction which is effective in operation to steer the vehicle through curved portions and straight portions of the transportation system and to steer the vehicle from one path of travel to another path of travel as the vehicle passes through a vehicle switch.

SUMMARY OF THE INVENTION

This invention relates to a steering mechanism and, more particularly, to a steering mechanism for a vehicle of a guided transportation system.

In accordance with the teachings of this invention, the steering mechanism for a guided vehicle transportation system has the following general structure. An axle having vehicle wheels secured at opposite ends thereof has its central portion pivotably connected to vehicle support structure. The axle also has a pair of vehicle steering structures, each of the structures being located on a side of the axle between its central portion and an associated one of the vehicle wheels. Each of these steering structures includes a front and a back guide wheel for engaging a guide rail to direct the vehicle along the transportation system. A spring is provided which has an intermediate portion thereof secured to the portion of the axle adjacent the axle's central portion. This spring applies a biasing force along the axle in a direction away from the axle's central portion toward the associated vehicle wheel. The spring has a first end and a second end respectively extending to a position in front of and a position in back of an associated vehicle wheel. A first interconnecting device has a first end rotatably supporting the front guide wheel and a second end pivotably connected to the front end of the spring. This first interconnecting device normally positions the front guide wheel at a position at least, in part, outwardly beyond the associated vehicle wheel. A second interconnecting device has a first end rotatably supporting the back guide wheel and a second end pivotably connected to the back end of the spring. This second interconnecting device normally positions the back guide wheel at a position at least, in part, outwardly beyond the associated vehicle wheel. A first guide structure is coupled to the first interconnecting device to permit this interconnecting device to move from its normal position relative to the associated vehicle wheel to cause a loading or an unloading of the front end of the spring in accordance with the direction of movement of the first interconnecting device. A second guide structure is coupled with the second interconnecting device to permit this second interconnecting device to move from its normal position relative to the associated vehicle wheel to cause a loading or an unloading of the back end of the spring in accordance with the direction of movement of the second interconnecting device. A deployable switching structure is also provided to hold the guide wheels in contact with an associated guide rail when the switching structure is deployed.

The steering mechanism for the guided vehicle is operative in accordance with the turning moment generated by the loading and unloading of the spring by movement of the guide wheels to various positions. When one end of the spring is loaded and the other end is unloaded, a turning moment is generated about the pivotable connection point between the axle and the vehicle support structure. This turning moment causes the axle to rotate and thereby steer the vehicle.

BRIEF DESCRIPTION OF THE DRAWINGS

FIG. 1 is a front elevational view of a guided transportation system employing the steering mechanism of this invention.

FIG. 2 is a plan view of a vehicle switch for the guided transportation system.

FIG. 4 is a plan, schematic view of the steering mechanism of this invention and the manner in which it reacts when the vehicle is moving through a normal curve in the transportation system.

FIG. 5 is a plan, schematic view of the steering mechanism of this invention and the manner in which it reacts when the vehicle is passing through a switch of the transportation system.

DESCRIPTION OF THE PREFERRED EMBODIMENT CONSTRUCTION

Figure 3:
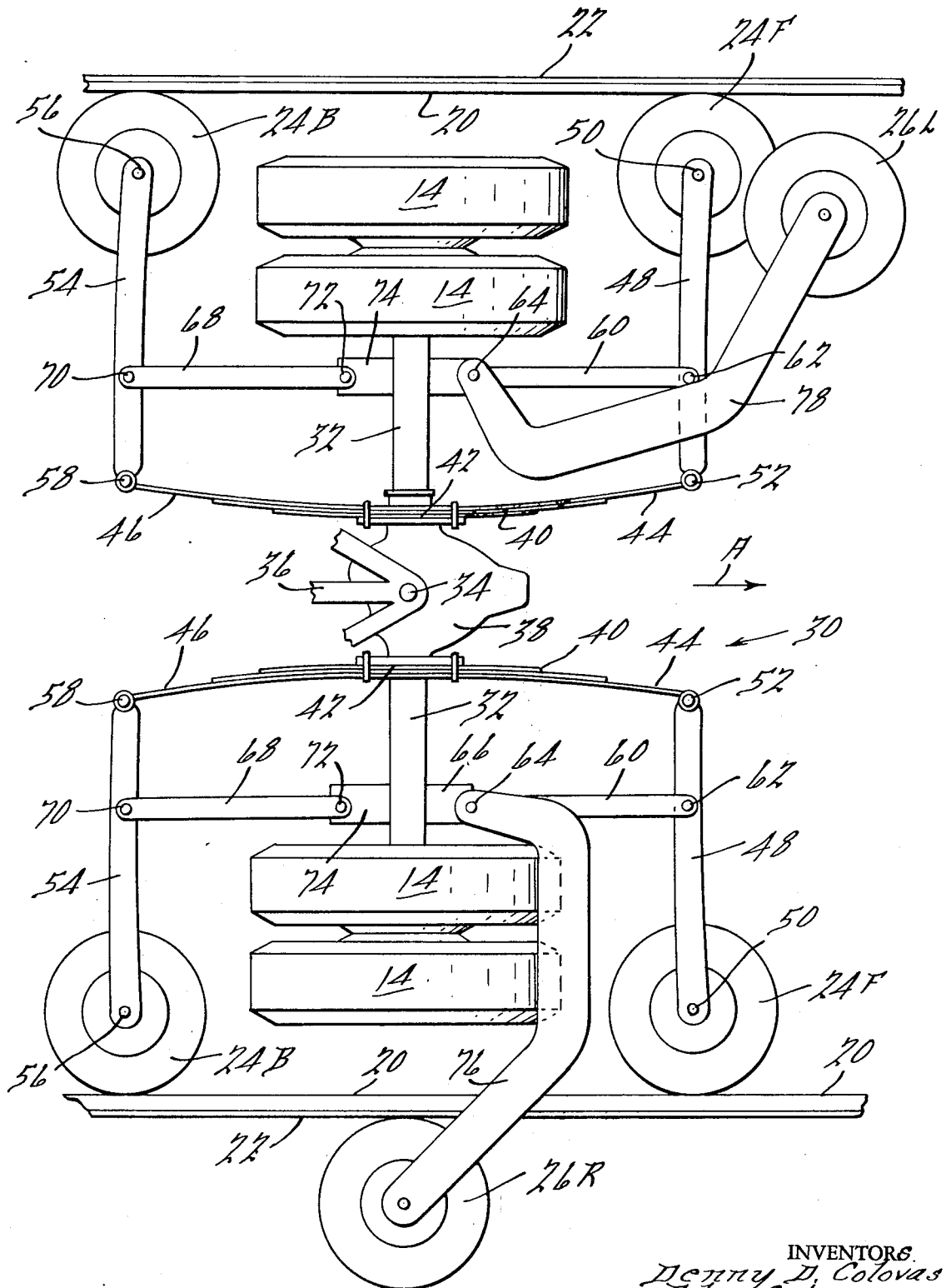
FIG. 3 is a plan view of the steering mechanism of this invention associated with one axle of the vehicle employed in the guided transportation system.

In FIGS. 1 and 2 there is shown a guided transportation system which is identified generally by the numeral 10. A vehicle 12 is mounted on a plurality of pneumatic tires 14 for movement along a vehicle path 16. A side wall structure, generally identified by the numeral 18, is provided on each side of the path. This side wall structure contains a guide rail 20 as well as switch rails 22 where required. The vehicle path and side wall construction are more fully described in our copending application Ser. No. 169,396, filed May 3, 1971. The vehicle is kept in proper alignment for its movement along the vehicle path by contact of the guide rails 20 by a plurality of guide wheels 24 associated with the vehicle. In straight or curved sections of the vehicle path, only the contact between the guide rails and the guide wheels is necessary to steer the vehicle because of the nature of the steering mechanism of this invention. However, when the vehicle passes through a switch, such as illustrated in FIG. 2, the deployment of a switch wheel 26 (FIG. 1) to engage the switch rail is necessary either from the right or from the left of the vehicle in order to steer the vehicle through the switch. Since the general structure of the guided transportation system employing the steering mechanism of this invention has been discussed, the steering mechanism of this invention, generally denoted by the numeral 30, will be discussed with particular reference to FIGS. 3, 4 and 5.

As best illustrated in FIG. 3, the steering mechanism 30 is associated with an axle 32 of the vehicle 12. While only one axle is shown, it is understood that the structure of the invention may be used with all of the axles of the vehicle. The axle is pivotably secured by a pivot pin 34 to support structure 36 which forms the undercarriage and supporting structure for the body of the vehicle 12. The axle also supports the vehicle tires 14 on opposite ends thereof.

A vehicle steering structure, in accordance with the teachings of this invention, is mounted on each side of the axle in positions between a central portion 38 of the axle 32 and the vehicle tires 14 on opposite ends thereof. Each of the steering structures includes a front guide wheel 24F and a back guide wheel 24B. As previously described, the guide wheels contact the guide rails 20 in order to position the vehicle 12 properly along its path of movement in the direction of arrow A of the figures.

A leaf spring 40 has a central portion 42 thereof secured to the axle at a position adjacent the axle's central portion 38. The spring has a first end 44 extending to a position in front of an associated vehicle tire 14 and a second end 46 extending to a position in back of the associated vehicle tire. A first lever arm 48 has rotatable structure 50 on one end thereof which secures the guide wheel 24F thereto. The other end of the first lever arm 48 is secured by a pivotable connection 52 to the first end 44 of the spring. The first lever arm 48 is of sufficient length that the front guide wheel 24F extends, at least in part, outwardly beyond the associated vehicle tire 14. The spring 40 is so designed that it applies a spring force on the guide wheel 24F to bias it into contact with the guide rail 20.

A second lever arm 54 supports rotatable structure 56 on one end thereof which, in turn, rotatably supports the guide wheel 24B for movement along the guide rail 20. The other end of the second lever arm 54 has a pivotable connection 58 thereon connecting it to the second end 46 of the spring 40. The second lever arm 54 is of similar length to the first lever arm 48 so that the rear guide wheel 24B is deployed outwardly beyond the associated vehicle tire 14.

A third lever arm 60 is secured by a pivotable connection 62 to an intermediate portion of the first lever arm 48. A pivotable connection 64 secures the other end of the third lever arm 60 to an extension 66 formed from the axle 32.

A fourth lever arm 68 is secured at one end by a pivotable connection 70 to an intermediate portion of the second lever arm 54. The other end of the fourth layer arm 68 is secured by a pivotable connection 72 to an extension 74 of the axle 32.

The right switch wheel 26R is deployably mounted by a right switch arm 76 about the pivotable connection 64. A left switch arm 78 deployably mounts the left switch wheel 26L about the pivotable connection 64 on the left side of the vehicle. The manner in which the switch wheels are deployed by the switch arms is the subject matter of our copending patent application Ser. No. 186,211, filed Oct. 4, 1971. Since the deployment mechanism is fully described in that application, no further description will be given herein.

OPERATION

The operation of the steering mechanism of this invention will be best understood by reference to FIGS. 3, 4 and 5. When the vehicle 12 is traveling along a straight portion of the vehicle path 16, the guide wheels 24 on both the right and the left hand side of the vehicle are in contact with the guide rails 20. The guide wheels 24 are positioned in a normal position with respect to their associated vehicle tires 14 by means of the first, the second, the third and the fourth lever arms cooperating with the leaf spring 40. In a normal position, the leaf spring biases both of the first and second lever arms to a normal position in which both guide wheels associated therewith are spaced the same distance outwardly beyond their associated vehicle tires. As the vehicle progresses down a straight portion of the vehicle path, with the guide wheels in a balanced position, no load is placed on the leaf springs 40 and therefore no turning moment is applied about the pivot pin 34 between the central portion 38 of the vehicle's axle 32 and the vehicle support structure 36.

Reference is now made to FIG. 4 which depicts the action of the steering mechanism when the vehicle 12 moves into a curved portion of the vehicle path 16. In this case, as is apparent from FIG. 4, the vehicle tires 14 tend move in a direction away from an aligned position in the vehicle path. However, since the first lever arm 48 and the second lever arm 54 are pivotably connected to the rest of the structure, the guide wheels 24 more relative to the vehicle tires because of the spring's biasing force which keeps them into contact with their associated guide rails 20. This movement of the guide wheel causes the loads on different ends of the spring to change. More particularly, in the case shown in FIG. 4, the load on the first end 44 of the spring will be decreased, while the load on the second end 46 of the same spring will be increased. This loading and unloading of opposite ends of the spring produces a turning moment which acts about the pivot pin 34. The result of the turning moment is a shift or turning of the axle 32 about the pivot pin 34 whereby the vehicle tires are once again aligned properly with the vehicle path and proceed thereby through the curve. Again when the springs have equal loads on both ends thereof, no further turning action is produced about the pivot pin 34 and the vehicle moves along the desired path of travel.

Thus, the steering of the vehicle 12 through a curve is accomplished by the manner in which the springs 40 are loaded and unloaded. The springs are loaded and unloaded by the action of the guide wheels 24 on opposite sides of the axle contacting and moving relative to the guide rails 20 on each side of the vehicle path 16.

When the vehicle 12 passes through a vehicle switch, such as illustrated in Fig. 2, the use of guide rails 20 on both sides of the vehicle is eliminated. In order to guide the vehicle through the switch and to provide a means for steering the vehicle through the switch, right and left vehicle switch arms, respectively designated 76 and 78, are employed. Only one of the switch arms is deployed at the time depending upon the direction of travel which is selected for the vehicle when it passes through the switch. The mechanism for deploying either one of the switch arms is described in our aforementioned patent application, Ser. No. 169,396.

The principal of operation of the steering mechanism for travel through a switch is similar to that described for travel along a curved portion of the vehicle path 16. In particular, as the vehicle 12 proceeds into the switch with its right switch arm 76 deployed, the deployed switch arm and wheel associated therewith will hold the axle 32 at a relatively fixed distance from the guide rail 20. However, there will be enough shifting of the axle that the front and the rear guide wheels 24 will move relative to one another whereby a loading and unloading of the different ends of the spring 40 is accomplished. Again, once the load on the opposite ends of the spring is different, the vehicle axle 32 will pivot about its pivot pin 34 connection to the vehicle support structure 36 whereby the vehicle is steered through the switch. Once again, when the opposite ends of the leaf spring 40 achieve a condition wherein they both have the same load, the turning moment about the pivot pin 34 no longer exists and the vehicle again proceeds along its normal path of movement.

There has been disclosed herein a steering mechanism for a vehicle employed in a guided transportation system. The steering mechanism is of such a type that all the active elements thereof are carried "onboard" the vehicle. Passive elements, which cooperate with the active elements of the steering mechanism, are carried along the path of travel of the vehicle. The steering mechanism of this invention is simple and efficient in operation and is economical to construct.

Many modifications of the steering mechanism for the guided transportation system of this invention will be obvious to those skilled in the art in view of the teachings of this specification. It is intended that all such modifications which fall within the true spirit and scope of this invention be included within the appended claims.

We claim:

1. A steering mechanism for a vehicle of a guided transportation system, which steering mechanism comprises:

vehicle support structure;

an axle having a central portion pivotably connected to said vehicle support structure, said axle also having vehicle wheels secured to opposite ends thereof, said axle having a vehicle steering structure located on each side of said axle between said axle's central portion and said associated vehicle wheel, each of said steering structures including (a) to (f);

a. front and back guide wheel means for engaging a guide rail to direct the vehicle along the transportation system;

b. spring means for applying a biasing force along said axle in a direction away from said axle's central portion, said spring means secured at an intermediate portion thereof to a portion of said axle adjacent said axle's central portion, said spring means having a first end and a second end respectively extending to a position in front of and a position in back of an associated wheel secured to said axle;

c. first interconnecting means having a first end rotatably supporting said front guide wheel means and a second end pivotably connected to said front end of said spring means, said first interconnecting means for normally positioning said front guide wheel means at a position at least, in part, outwardly beyond said associated vehicle wheel;

d. second interconnecting means having a first end rotatably supporting said back guide wheel means and a second end pivotably connected to said back end of said spring means, said second interconnecting means for normally positioning said back guide wheel means at a position at least, in part, outwardly beyond said associated vehicle wheel;

e. first guide means associated with said first interconnecting means for permitting said first interconnecting means to move from its said normal position relative to said associated vehicle wheel to cause a loading or an unloading of said front end of said spring means in accordance with the direction of movement of said first interconnecting means; and f. second guide means associated with said second interconnecting means for permitting said second interconnecting means to move from its said normal position relative to said associated vehicle wheel to cause a loading or an unloading of said back end of said spring means in accordance with the direction of movement of said second interconnecting means, and a deployable switching means for holding said guide wheel means in contact with the associated guide rail when said switching means is deployed.

2. The steering mechanism of claim 1 wherein: said spring means is a leaf spring.

3. The steering mechanism of claim 1 wherein: said first and said second interconnecting means are solid lever arms.

4. The steering mechanism of claim 3 wherein: said first and said second guide means are solid lever arms which are respectively secured at one end to an intermediate portion of said first and said second interconnecting means and at the other end secured to said axle at a position adjacent said associated vehicle wheel.

5. A steering mechanism for a vehicle of a guided transportation system, which steering mechanism comprises:

vehicle support structure;

an axle having a central portion pivotably connected to said vehicle support structure, said axle also having vehicle wheels secured to opposite ends thereof, said axle also having a vehicle steering structure located on each side of said axle between said axle's central portion and said associated vehicle wheel, each of said steering structures including (a) to (f);

a. front and back guide wheel means for engaging a guide rail to direct the vehicle along the transportation system;

b. spring means for applying a biasing force along said axle in a direction away from said axle's central portion, said spring means secured at an intermediate portion thereof to a portion of said axle adjacent said axle's central portion, said spring means having a first end and a second end respectively extending to a position in front of and to a position in back of an associated vehicle wheel secured to said axle;

c. a first lever arm having two ends, one end of said first lever arm being rotatably secured to said front guide wheel means and the other end of said first lever arm being pivotably connected to said front end of said spring means, said first lever arm being of sufficient length that said front guide wheel means extends, at least in part, outwardly beyond said vehicle wheel;

d. a second lever arm having two ends, one end of said second lever arm being rotatably secured to said back guide wheel means and the other end of said second lever arm being pivotably connected to said back end of said spring means, said second lever arm being of sufficient length that said back guide wheel means extends, at least in part, outwardly beyond said associated vehicle wheel;

e. a third lever arm having two ends, one end of said third lever arm being pivotably secured to an intermediate portion of said first lever arm and the other end of said third lever arm being pivotably connected to said axle adjacent said associated vehicle wheel secured thereto; and f. a fourth lever arm having two ends, one end of said fourth lever arm being pivotably secured to an intermediate portion of said second lever arm and the other end of said fourth lever arm being pivotably connected to said axle adjacent said vehicle wheel secured thereto; and a deployable switching means for holding said guide wheel means in contact with the associated guide rail when said switching means is deployed.

6. The steering mechanism of claim 5 wherein: said spring means is a leaf spring.

* * * * *